(12) United States Patent
Fu

(10) Patent No.: US 10,638,666 B2
(45) Date of Patent: May 5, 2020

(54) POWER TOOL AND TRANSMISSION SHAFT ASSEMBLY THEREOF

(71) Applicant: Nanjing Chervon Industry Co., Ltd., Nanjing (CN)

(72) Inventor: Huixing Fu, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 63 days.

(21) Appl. No.: 15/852,465

(22) Filed: Dec. 22, 2017

(65) Prior Publication Data

US 2018/0177135 A1 Jun. 28, 2018

(30) Foreign Application Priority Data

Dec. 23, 2016 (CN) .................... 2016 2 1434047 U

(51) Int. Cl.
  *A01G 3/053* (2006.01)
  *A01G 3/06* (2006.01)
  *B25F 5/02* (2006.01)
  *F16C 3/02* (2006.01)
  *F16H 3/64* (2006.01)

(52) U.S. Cl.
  CPC ............ *A01G 3/053* (2013.01); *A01G 3/062* (2013.01); *B25F 5/02* (2013.01); *F16C 3/02* (2013.01); *F16H 3/64* (2013.01)

(58) Field of Classification Search
  CPC .. A01G 3/062; A01G 3/053; A01D 2034/907; A01D 34/90; A01D 34/902; A01D 34/905; B25F 3/00; B25F 5/02

USPC ................................................. 30/276, 296.1
  See application file for complete search history.

(56) References Cited

U.S. PATENT DOCUMENTS

| 3,580,214 | A | * | 5/1971 | Muller | B63H 5/10 |
| | | | | | 440/112 |
| 4,122,601 | A | * | 10/1978 | Katsuya | A01D 34/90 |
| | | | | | 172/41 |
| 4,126,928 | A | * | 11/1978 | Hoff | F16C 1/06 |
| | | | | | 138/149 |
| 4,226,021 | A | * | 10/1980 | Hoff | A01D 34/90 |
| | | | | | 30/276 |
| 4,505,040 | A | * | 3/1985 | Everts | A01D 34/416 |
| | | | | | 172/41 |
| 4,654,971 | A | * | 4/1987 | Fettes | A01G 3/08 |
| | | | | | 30/296.1 |

(Continued)

*Primary Examiner* — Laura M Lee
(74) *Attorney, Agent, or Firm* — Greenberg Traurig, LLP

(57) ABSTRACT

A transmission shaft assembly includes a connecting tube extended along a central axis, a transmission shaft being a rigid shaft made of metal material, which is extended along the central axis and disposed in the connecting tube, a first limiting element disposed on an end of the connecting tube and formed with a first hole allowing the transmission shaft to pass there through, a second limiting element disposed on the other end of the connecting tube and formed with a second hole allowing the transmission shaft to pass there through, and a bushing. The bushing includes a main body formed with a channel extended along the central axis and several projecting parts disposed on the periphery of the main body. The bushing is located in the connecting tube and disposed between the first limiting element and the second limiting element. The transmission shaft passes through the first hole, the channel, and the second hole successively.

3 Claims, 7 Drawing Sheets

(56) References Cited

U.S. PATENT DOCUMENTS

| | | | | |
|---|---|---|---|---|
| H000380 | H * | 12/1987 | Yokocho | 30/276 |
| 4,733,471 | A * | 3/1988 | Rahe | A01D 34/90 30/276 |
| 5,364,307 | A * | 11/1994 | Shaulis | F16C 1/06 30/276 |
| 5,819,418 | A * | 10/1998 | Uhl | A01G 3/08 30/296.1 |
| 6,010,407 | A * | 1/2000 | Ishikawa | F16C 1/06 30/276 |
| 6,305,867 | B1 * | 10/2001 | Schweigert | A01D 34/90 30/296.1 |
| 7,275,325 | B2 * | 10/2007 | Warashina | A01D 34/826 30/122 |
| 7,484,300 | B2 * | 2/2009 | King | A01G 3/08 30/166.3 |
| 7,627,952 | B2 * | 12/2009 | Richards | A01D 34/90 30/276 |
| 8,641,314 | B2 * | 2/2014 | Thacker | F16B 7/00 285/276 |
| 9,333,636 | B2 * | 5/2016 | Yamada | A01D 34/90 |
| 9,897,135 | B2 * | 2/2018 | Miyakawa | A01G 3/033 |
| 2013/0075122 | A1 * | 3/2013 | Yamada | A01D 34/90 173/213 |
| 2016/0021819 | A1 * | 1/2016 | Nakano | A01G 3/062 30/276 |
| 2017/0002861 | A1 * | 1/2017 | Davis | F16L 57/00 |
| 2017/0079215 | A1 * | 3/2017 | Bian | A01G 3/08 |
| 2017/0265388 | A1 * | 9/2017 | Fohrenbach | A01D 34/416 |
| 2018/0177135 | A1 * | 6/2018 | Fu | A01G 3/053 |

\* cited by examiner

POWER TOOL AND TRANSMISSION SHAFT ASSEMBLY THEREOF

RELATED APPLICATION INFORMATION

This application claims the benefit under 35 U.S.C. § 119(a) of Chinese Patent Application No. CN 201621434047X, filed on Dec. 23, 2016, the disclosure of which is incorporated herein by reference in its entirety.

FIELD OF THE DISCLOSURE

The present disclosure relates generally to a power tool and a transmission shaft assembly thereof.

BACKGROUND OF THE DISCLOSURE

Pole saws, grass trimmers and hedge trimmers with extension handles belong to long-rod type power tools with a long connecting rod. A motor and a work attachment are disposed on two ends of the connecting rod. A transmission shaft is disposed in the connecting rod.

During operation of currently known long-rod type power tools, it is easy to generate vibration in the connecting rod because of the long transmission shaft.

The statements in this section merely provide background information related to the present disclosure and may not constitute prior art.

SUMMARY

In one aspect of the disclosure, a transmission shaft assembly is provided. The transmission shaft assembly includes a connecting tube extended along a central axis, a transmission shaft being a rigid shaft made of metal material, which is extended along the central axis and disposed in the connecting tube, a first limiting element disposed on an end of the connecting tube and formed with a first hole allowing the transmission shaft to pass there through, a second limiting element disposed on the other end of the connecting tube and formed with a second hole allowing the transmission shaft to pass there through, and a bushing. The bushing includes a main body formed with a channel extended along the central axis and several projecting parts disposed on the periphery of the main body. The bushing is located in the connecting tube and disposed between the first limiting element and the second limiting element. The transmission shaft passes through the first hole, the channel and the second hole successively.

In another aspect of the disclosure, a power tool is provided. The power tool includes a motor, a work attachment driven by the motor to perform the function of the tool, and a transmission device for connecting the motor and the work attachment and transmitting power of the motor to the work attachment. The transmission device includes a transmission shaft assembly. The transmission shaft assembly includes a connecting tube extended along a central axis, a transmission shaft being a rigid shaft made of metal material, which is extended along the central axis and disposed in the connecting tube, a first limiting element disposed on an end of the connecting tube and formed with a first hole allowing the transmission shaft to pass there through, a second limiting element disposed on the other end of the connecting tube and formed with a second hole allowing the transmission shaft to pass there through, and a bushing. The bushing includes a main body formed with a channel extended along the central axis and several projecting parts disposed on the periphery of the main body. The bushing is located in the connecting tube and disposed between the first limiting element and the second limiting element. The transmission shaft passes through the first hole, the channel and the second hole successively.

Further areas of applicability will become apparent from the description provided herein. It should be understood that the description and specific examples are intended for purposes of illustration only and are not intended to limit the scope of the present disclosure.

Figure 1:
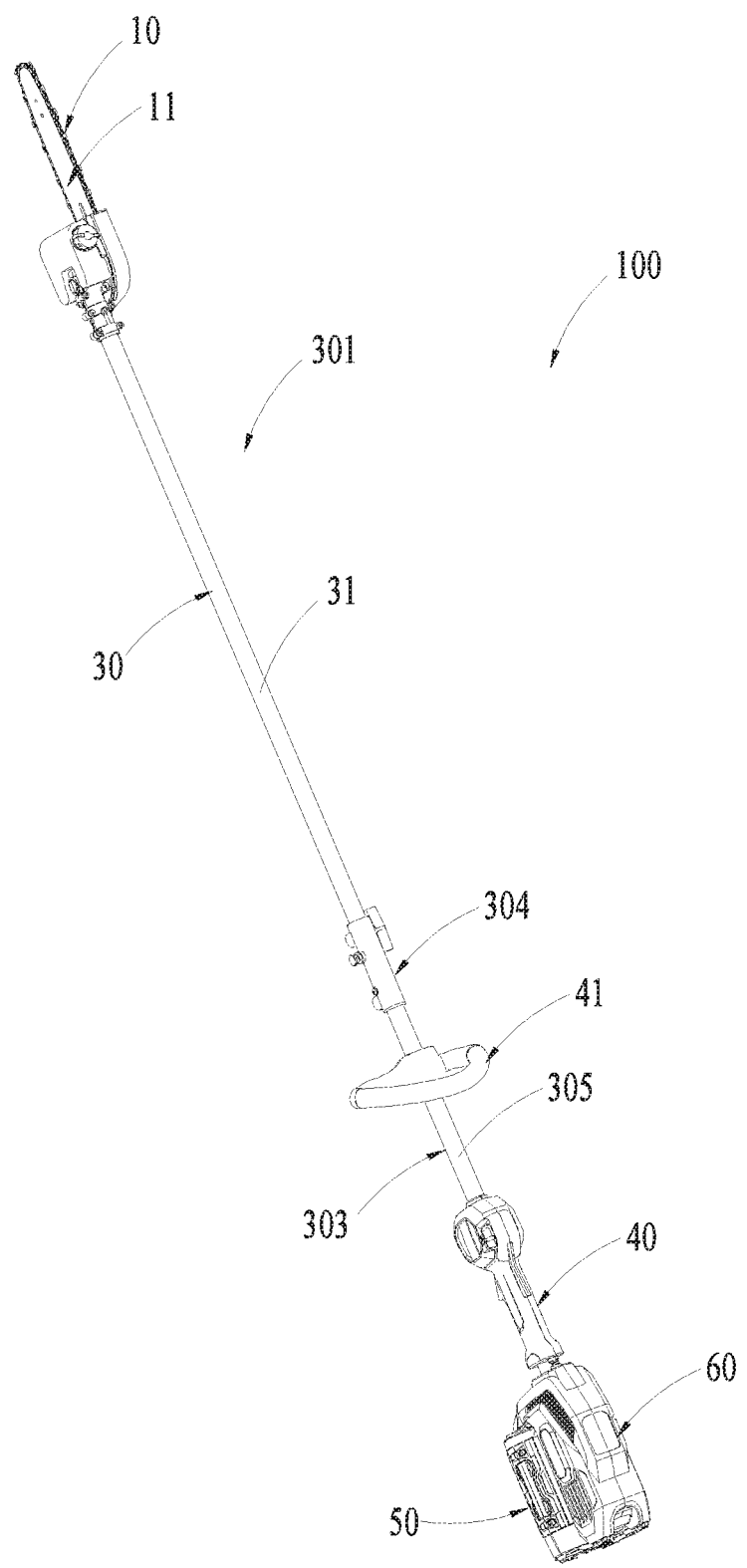
FIG. 1 is a schematic view of an exemplary power tool.

The drawings described herein are for illustrative purposes only of selected embodiments and not all possible implementations, and are not intended to limit the scope of the present disclosure. Corresponding reference numerals indicate corresponding parts throughout the several views of the drawings.

DETAILED DESCRIPTION

The following description of the preferred embodiments is merely exemplary in nature and is in no way intended to limit the scope of the invention hereinafter claimed, its application, or uses.

Figure 2:
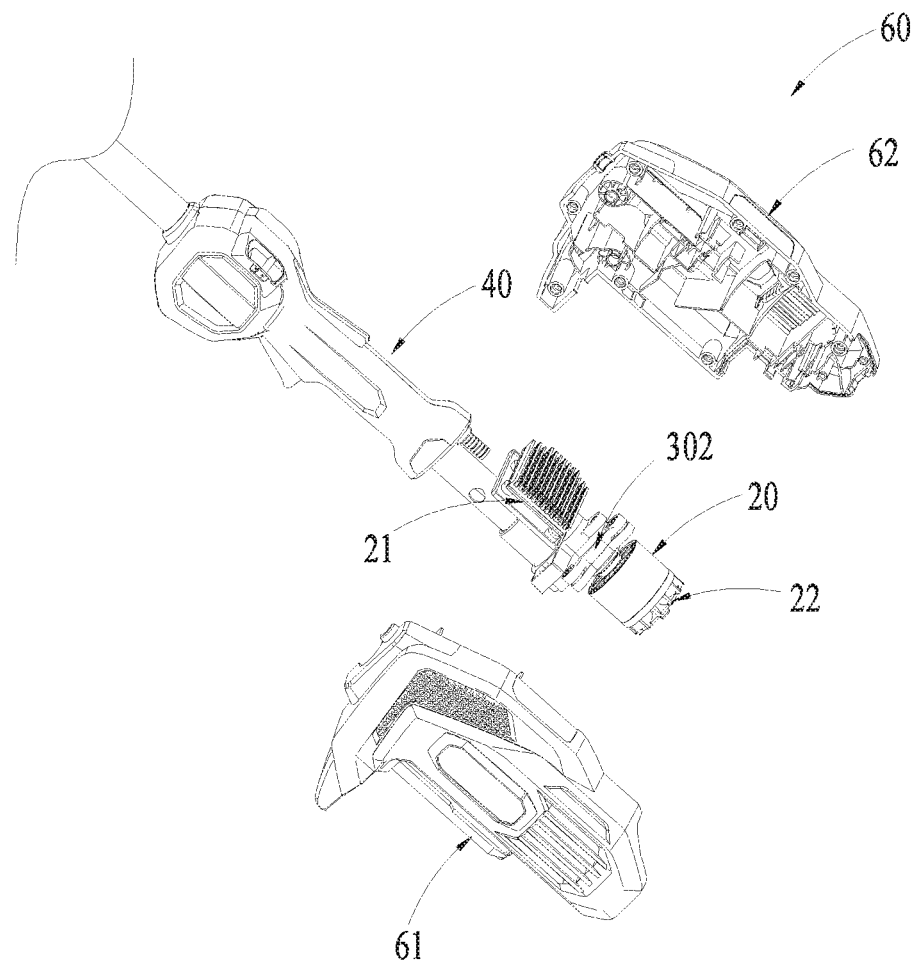
FIG. 2 an exploded view of a part of the power tool in FIG. 1.

Referring to FIGS. 1-2, a power tool 100 includes a work attachment 10, a motor 20, a transmission device 301 and a main handle 40.

The work attachment 10 for performing the function of the tool is driven by the motor 20. The motor 20 can be an inner combustion engine powered by burning fuel or an electric motor powered by electricity. Specifically, the motor 20 is an electric motor. The power tool 100 further includes a battery pack 50 for supplying power to the motor 20 which is connected with the motor 20 electrically. The power tool 100 is an electric power tool. The transmission device 301 is connected with the motor 20 and the work attachment 10 to transmit the power of the motor 20 to the work attachment 10. The main handle 40 is for a user to grip, which is disposed between the work attachment 10 and the motor 20. The power tool 100 also can be called a hand-held power tool 100. The power tool 100 further includes an auxiliary handle 41 for the user to grip. During operation of the power tool 100, the user can grip the main handle 40 and the auxiliary handle 41 with two hands respectively.

The power tool 100 includes a housing 60 for mounting the motor 20. The motor 20 is disposed within the housing 60. The battery pack 50 is removably connected with the housing 60. The power tool 100 includes a circuit board 21 for controlling the motor 20 which is disposed within the housing 60. The power tool 100 further includes a fan 22 for cooling the motor 20 which is driven to rotate by the motor 20. The fan 22 rotates to provide an airflow that will flow through the motor 20 and the circuit board 21 so as to cool the motor 20 and the circuit board 21. The housing 60 includes a left housing 61 and a right housing 62 which cooperatively form a containing chamber for containing the motor 20.

Specifically, the work attachment in FIG. 1 is a saw chain, and the power tool 100 is a pole saw. The power tool 100 further includes a guide plate 11 for guiding the saw chain to rotate. The guide plate 11 is formed with a guide slot. The saw chain is at least partially located in the guide slot. The power tool 100 is not limited to the pole saw. In other embodiments, the power tool 100 may be a hedge trimmer or a grass trimmer.

Referring to FIGS. 1-2, the transmission device 301 includes a transmission shaft assembly 30, a gear box 302, a second transmission shaft assembly 303 and a connecting base 304. The gear box 302 is disposed in the housing 60. The connecting base 304 is used to connect the transmission shaft assembly 30 and the second transmission shaft assembly 303. The second transmission shaft assembly 303 has the same structure as the transmission shaft assembly 30. Or, it could be said that the transmission device 301 can include several transmission shaft assemblies 30 which are connected through the connecting bases 304. Specifically, the transmission shaft assembly 30 includes a connecting tube 31, and the second transmission shaft assembly 303 includes a second connecting tube 305. The connecting base 304 connects the connecting tube 31 and the second connecting tube 305.

Figure 3:
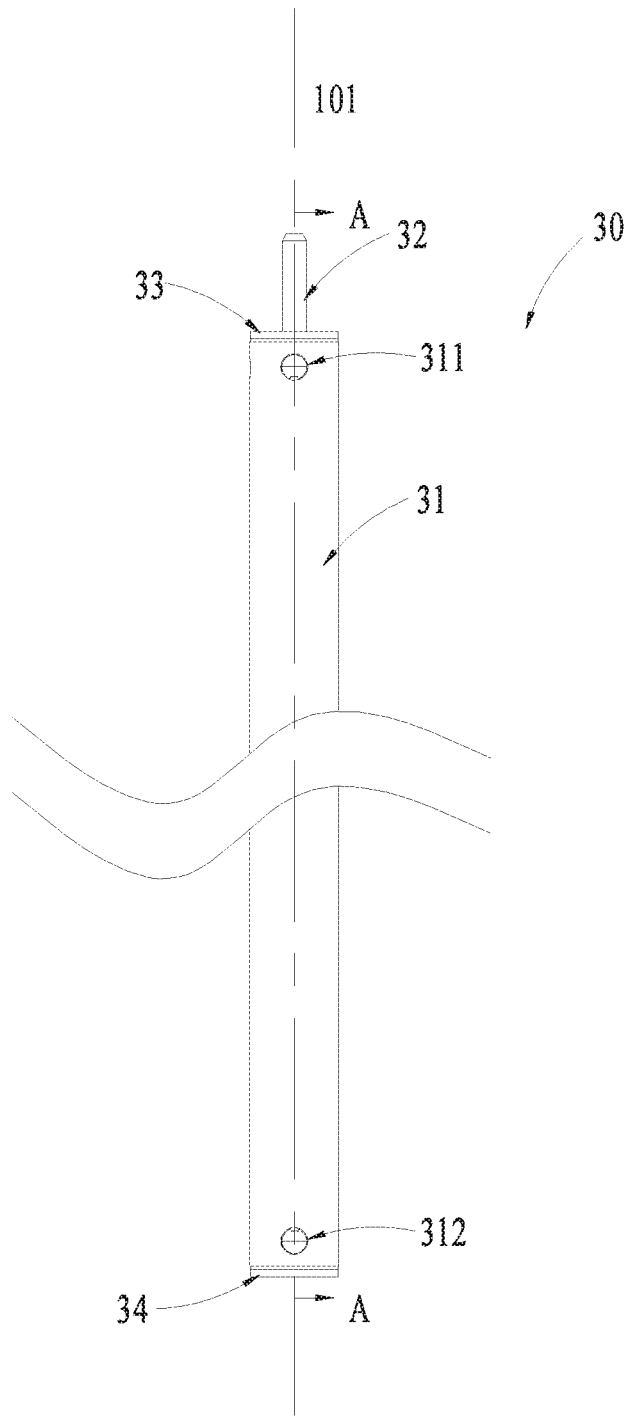
FIG. 3 is a plane view of a transmission shaft assembly of the power tool in FIG. 1.
Figure 4:
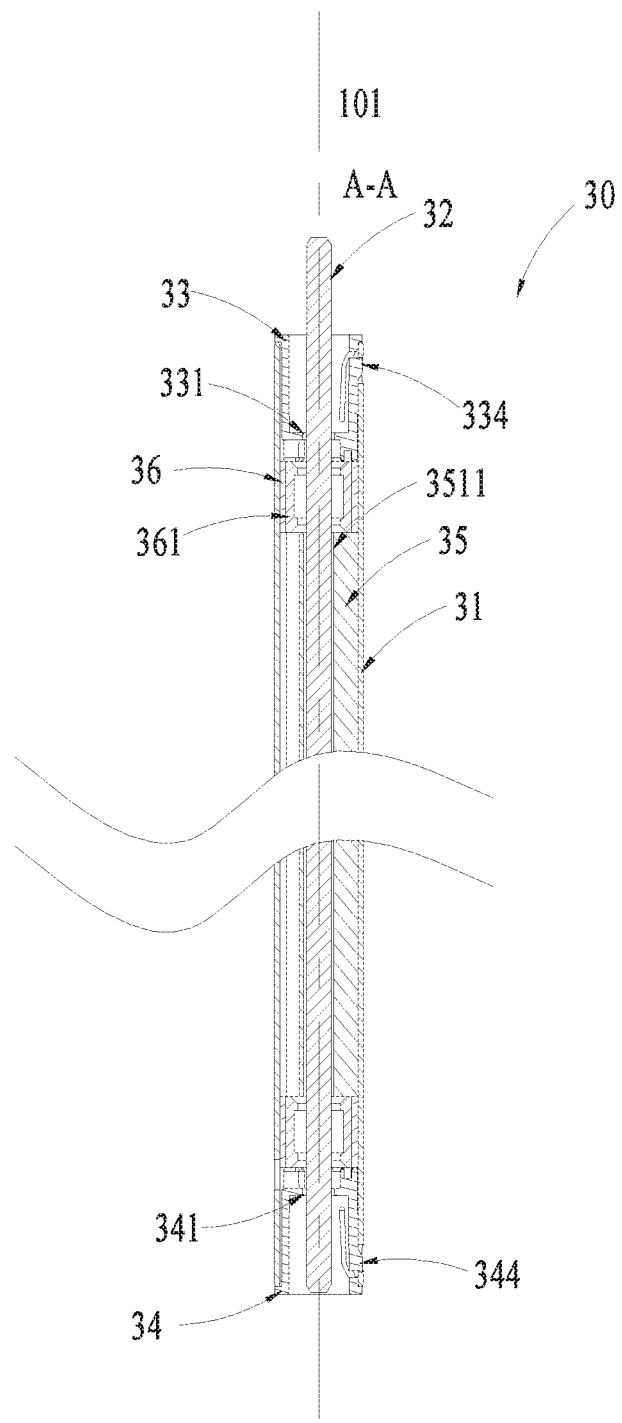
FIG. 4 is a section view of the transmission shaft assembly along A-A in FIG. 3.
Figure 5:
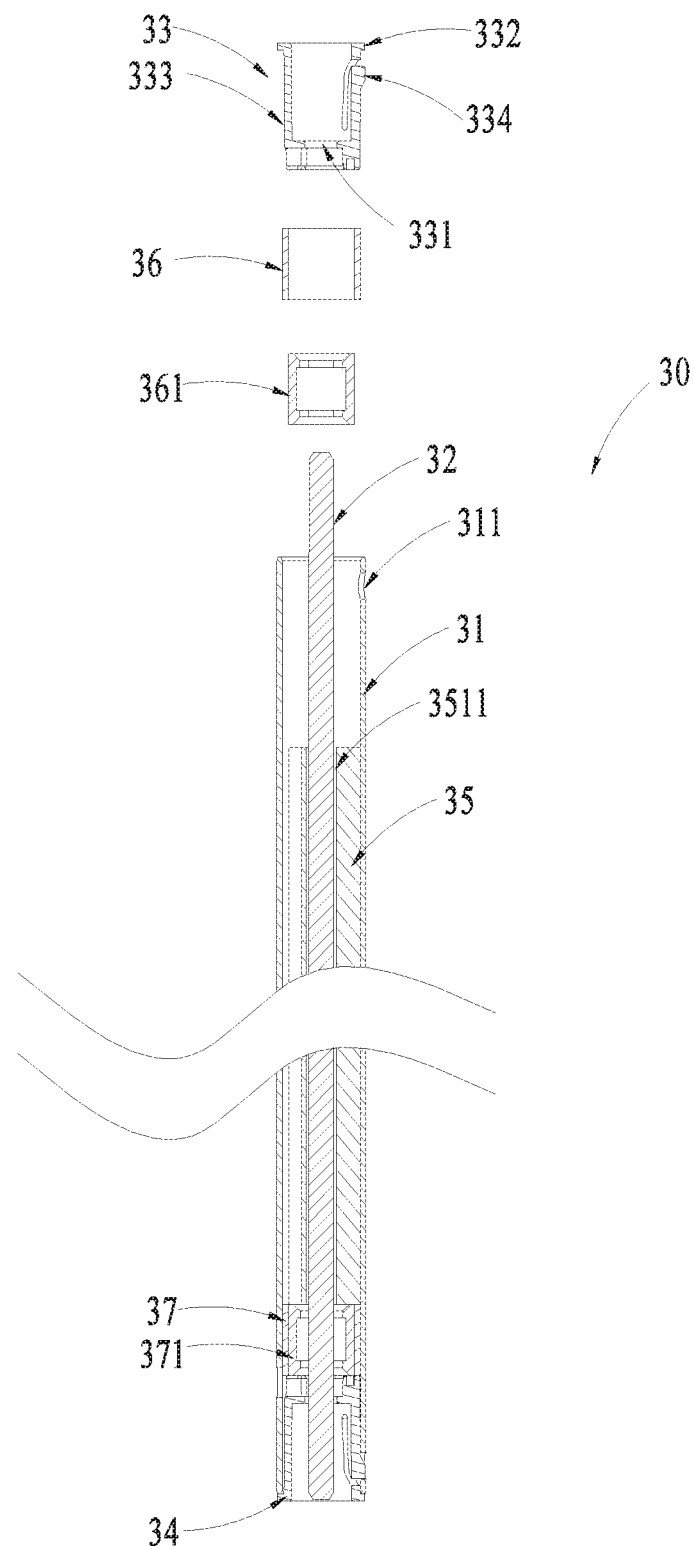
FIG. 5 is an exploded view of the transmission shaft assembly in FIG. 4.

Referring to FIGS. 3-5, the transmission shaft assembly 30 includes the connecting tube 31, a transmission shaft 32, a first limiting element 33, a second limiting element 34 and a bushing 35.

The transmission shaft 32 is driven by the motor 20 to rotate about a central axis 101. The connecting tube 31 is extended along the central axis 101. The transmission shaft 32 is disposed in the connecting tube 31. The transmission shaft 32 is made of metal material and is a rigid shaft, which cannot bend to any angle. However, a flexible shaft opposite to the rigid shaft can bend, and rotate about a rotation axis so as to transmit torque while it is bent. The rotation axis of the flexible shaft is an arc, and the rotation axis of the rigid shaft is a straight line.

The first limiting element 33 is disposed on one end of the connecting tube 31, and the second limiting element 34 is disposed on the other end of the connecting tube 31. The bushing 35 is located in the connecting tube 31. The first limiting element 33 and the second limiting element 34 limit the bushing 35 in the connecting tube 31 to prevent the bushing 35 from disengaging from the connecting tube 31. The bushing 35 is able to rotate relative to the connecting tube 31. Specifically, the bushing 35 is able to rotate relative to the connecting tube 31 about the central axis 101. The first limiting element 33 is formed with a first hole 331 allowing the transmission shaft 32 to pass there through, and the second limiting element 34 is formed with a second hole 341 allowing the transmission shaft 32 to pass there through.

Figure 6:
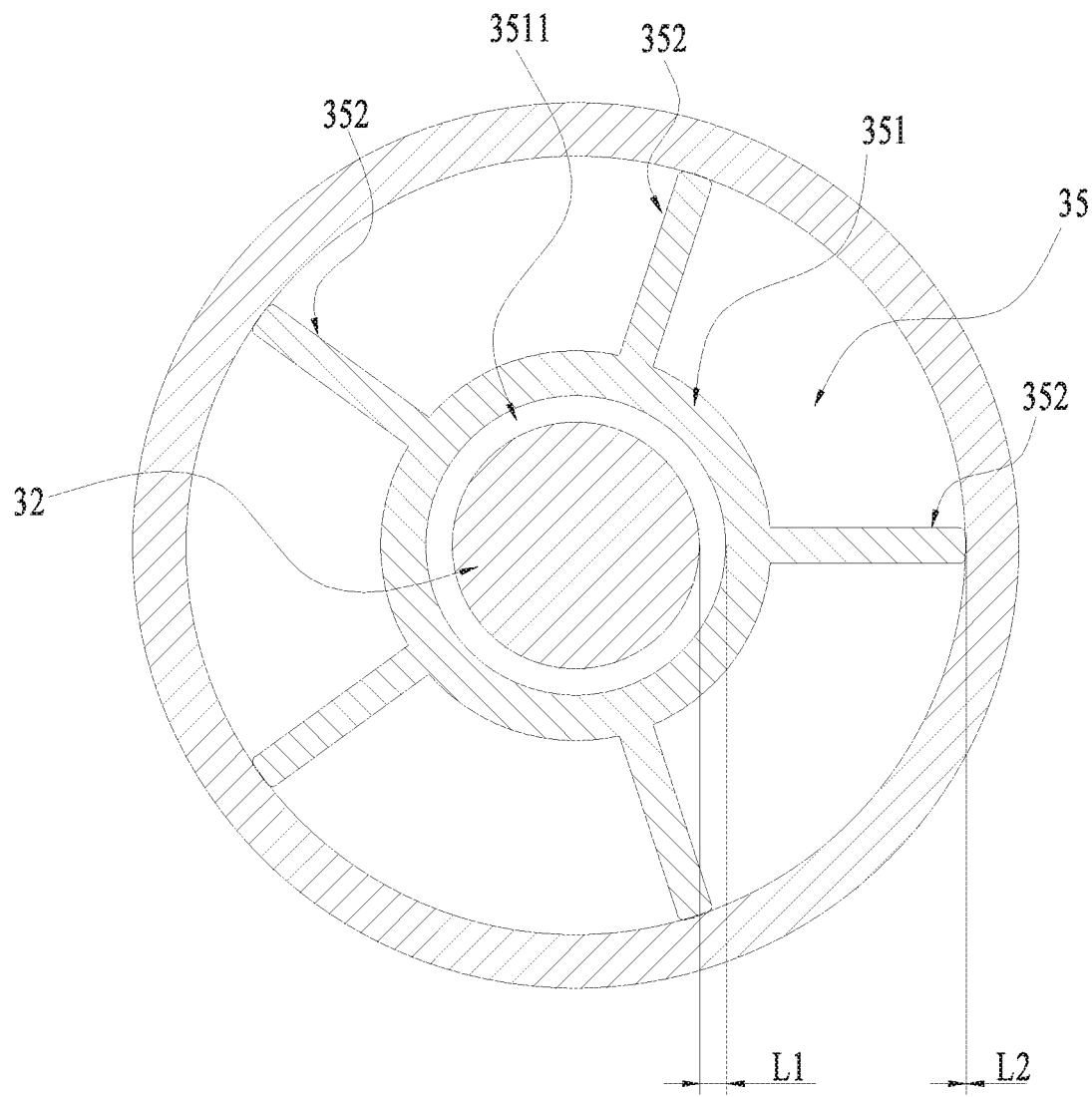
FIG. 6 is a section view of a transmission shaft, a bushing and a connecting tube in FIG. 4.

Referring to FIGS. 4-6, the bushing 35 includes a main body 351 and several projecting parts 352. The main body 351 is formed with a channel 3511 extended along the central axis 101. The several projecting parts 352 are disposed on the periphery of the main body 351. The transmission shaft 32 passes through the first hole 331, the channel 3511 and the second hole 341 successively. The projecting parts 352 are extended along the central axis 101. The main body 351 has a length in a direction of the central axis 101 which is equal to the length of the projecting parts 352 in the direction of the central axis 101.

A distance L1 from the outer wall of the transmission shaft to the inner wall of the channel 3511 is greater than a distance L2 from the projecting parts 352 to the inner wall of the connecting tube 31. The inner wall of the channel 3511 has a maximum size in a radial direction of the central axis 101 which is greater than the maximum size of the transmission shaft 32 in the radial direction of the central axis 101.

In a section perpendicular to the central axis 101, the several projecting parts 352 are disposed on the periphery of the main body 351 and distributed uniformly about the central axis 101. In the section perpendicular to the central axis 101, the channel 3511 formed by the main body 351 has a circular section, and the transmission shaft 32 has a circular section as well. In this section, the maximum size of the channel 3511 in the radial direction of the central axis 101 is a diameter of the channel 3511, and the maximum size of the transmission shaft 32 in the radial direction of the central axis 101 is a diameter of transmission shaft 32. The diameter of the channel 3511 is greater than the diameter of transmission shaft 32. The distance L1 from the outer wall of the transmission shaft 32 to the inner wall of the channel 3511 is ½ a difference between the maximum size of the channel 3511 and the maximum size of the transmission shaft 32 in the radial direction of the central axis 101. As a specific embodiment, the projecting parts 352 contact with the inner wall of the connecting tube 31, that is the distance from the projecting parts 352 to the inner wall of the connecting tube 31 is substantially equal to 0.

If the length of the transmission shaft 32 in the direction of the central axis 101 is too long, vibration may occur. A gap is disposed between the outer wall of the transmission shaft 32 and the inner wall of the channel 3511 and the transmission shaft 32 can be rotated freely relative to the bushing 35, so the slight vibration of the transmission shaft 32 that may occur in the channel 3511 is avoided from transmitting to the connecting tube 31 directly and transmitting to the main handle 40 finally. While, when the transmission shaft 32 produces greater vibration in the channel 3511, it strikes the inner wall of the channel 3511, and the torque of the transmission shaft 32 is transmitted to the bushing 35 and the bushing 35 is driven by the transmission shaft 32 to rotate, so the vibration is further reduced.

Referring to FIGS. 3-5, the first limiting element 33 and the second limiting element 34 are made of plastic material. The first limiting element 33 includes a first limiting portion 333 and a first contacting portion 332. The first limiting portion 333 is extended in the connecting tube 31, and the first contacting portion 332 contacts with an end of the connecting tube 31. The first contacting portion 332 has a size in the radial direction of the central axis 101 which is greater than the size of the first limiting portion 333 in the radial direction of the central axis 101. The first contacting portion 332 limits the first limiting element 33 to move toward a direction along the central axis 101 relative to the connecting tube 31.

The connecting tube 31 is formed with a first limiting hole 311 on its wall. The first limiting element 33 is formed with a first projection 334 for engaging with the first limiting hole 311. The first projection 334 is located in the first limiting hole 311. The engagement of the first projection 334 and the first limiting hole 311 limits the first limiting element 33 to move toward another direction along the central axis 101 relative to the connecting tube 31. The engagement of the first projection 334 and the first limiting hole 311 avoids the first limiting element 33 from disengaging with the connecting tube 31.

The connecting tube 31 is formed with a second limiting hole 312. The second limiting element 34 is formed with a second projection 344 for engaging with the second limiting hole 312. The second projection 344 is located in the second limiting hole 312. The engagement of the second projection 344 and the second limiting hole 312 limits the position of the second limiting element 34 relative to the connecting tube 31. Specifically, the second limiting element 34 can have the same structure as the first limiting element 33.

The transmission shaft assembly 30 further includes a first biasing element 36 disposed between the bushing 35 and the first limiting element 33. The first biasing element 36 applies a biasing force between the bushing 35 and the first limiting element 33, or it could be said that the first biasing element 36 applies a biasing force on the bushing 35 to limit the position of the bushing 35 relative to the connecting tube 31. Specifically, the first biasing element 36 applies a biasing force along the central axis 101 on the bushing 35. The first biasing element 36 has two ends which contact with the bushing 35 and the first limiting element 33 respectively. Specifically, the first biasing element 36 is a rubber element. The transmission shaft assembly 30 further includes a first bearing 361. Specifically, the first bearing 361 is an oil bearing. The first bearing 361 is sleeve-connected on the outside of the transmission shaft 32. The rubber element is sleeve-connected on the outside of the first bearing 361. The first bearing 361 supports the rubber element. The first biasing element 36 limits the position of the bushing 35 in the direction of the central axis 101 relative to the connecting tube 31, so that the vibration in this direction is reduced.

The transmission shaft assembly 30 further includes a second biasing element 37 disposed between the bushing 35 and the second limiting element 34. The bushing 35 is disposed between the first biasing element 36 and the second biasing element 37. The second biasing element 37 is a rubber element, which is sleeve-connected on the outside of a second bearing 37.

Figure 7:
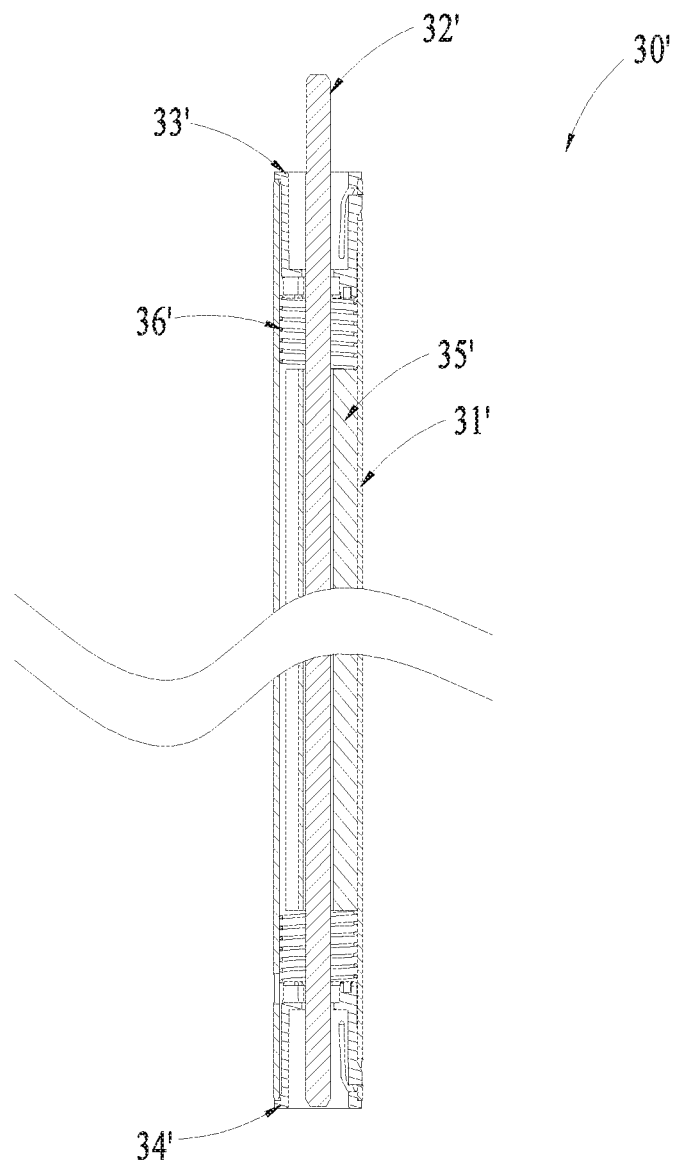
FIG. 7 is a section view of a further exemplary transmission shaft assembly.

As shown in FIG. 7, in another example, a transmission shaft assembly 30' includes a connecting tube 31', a transmission shaft 32', a first limiting element 33', a second limiting element 34', a bushing 35' and a first biasing element 36'.

The first biasing element 36' is a spring, which is disposed between the bushing 35' and the first limiting element 33'. Comparing with the transmission shaft assembly 30 in FIG. 4, the transmission shaft assembly 30' in FIG. 7 uses the spring as the first biasing element 36', and the bearings are omitted.

The above illustrates and describes basic principles, main features and advantages of the subject device. Those skilled in the art should appreciate that the above embodiments do not limit the invention hereinafter claimed in any form. Technical solutions obtained by equivalent substitution or equivalent variations are all intended fall within the scope of the claimed invention.

What is claimed is:
1. A power tool, comprising:
a motor;
a work attachment driven by the motor to perform a function of the power tool; and
a transmission device for connecting the motor and the work attachment to transmit power of the motor to the work attachment;
wherein the transmission device comprises a transmission shaft assembly, the transmission shaft assembly comprising:
a connecting tube extended along a central axis;
a transmission shaft, comprising a rigid shaft, which extends along the central axis and which is disposed in the connecting tube;
a first limiting element disposed on an end of the connecting tube and formed with a first hole allowing the transmission shaft to pass there through;
a second limiting element disposed on the other end of the connecting tube and formed with a second hole allowing the transmission shaft to pass there through;
a bushing comprising a main body formed with a channel extended along the central axis and several projecting parts disposed on the periphery of the main body;
a first biasing element applying a force on the bushing along the central axis; and
a first bearing that is sleeve-connected on the outside of the transmission shaft,
wherein the bushing is located in the connecting tube and disposed between the first limiting element and the second limiting element such that the transmission shaft passes through the first hole, the channel, and the second hole successively, and
wherein the first biasing element and the first bearing are disposed between the bushing and the first limiting element and the first biasing element is a rubber element that is sleeve-connected on the outside of the first bearing.
2. The power tool of claim 1, wherein a distance from an outer wall of the transmission shaft to an inner wall of the channel is greater than a distance from the projecting parts to an inner wall of the connecting tube.
3. The power tool of claim 1, wherein the power tool is a pole saw and, the work attachment is a saw chain.

* * * * *